US010646098B2

(12) United States Patent
Brignone

(10) Patent No.: US 10,646,098 B2
(45) Date of Patent: May 12, 2020

(54) INTEGRATED COMPONENT FOR A DISHWASHING MACHINE

(71) Applicant: BITRON S.P.A., Turin (IT)

(72) Inventor: Enzo Brignone, Frazione Monastero Dronero (IT)

(73) Assignee: BITRON S.P.A., Turin (IT)

(*) Notice: Subject to any disclaimer, the term of this patent is extended or adjusted under 35 U.S.C. 154(b) by 146 days.

(21) Appl. No.: 15/736,426

(22) PCT Filed: Jun. 17, 2016

(86) PCT No.: PCT/IB2016/053611
§ 371 (c)(1),
(2) Date: Dec. 14, 2017

(87) PCT Pub. No.: WO2016/203440
PCT Pub. Date: Dec. 22, 2016

(65) Prior Publication Data
US 2018/0168422 A1 Jun. 21, 2018

(30) Foreign Application Priority Data
Jun. 19, 2015 (IT) .................. 102015000025456

(51) Int. Cl.
C02F 1/42 (2006.01)
A47L 15/42 (2006.01)
C02F 103/00 (2006.01)

(52) U.S. Cl.
CPC ........ A47L 15/4231 (2013.01); A47L 15/4217 (2013.01); C02F 1/42 (2013.01);
(Continued)

(58) Field of Classification Search
CPC ............. A47L 15/4217; A47L 15/4229; A47L 15/4231; C01F 1/42; C01F 2001/425; C01F 2103/002; C01F 2303/16; C01F 2307/12
(Continued)

(56) References Cited

U.S. PATENT DOCUMENTS 3,363,637 A * 1/1968 Rumbaugh ......... A47L 15/4229
134/109
3,465,880 A * 9/1969 Lyall .................. B01J 49/75
210/136
4,307,742 A * 12/1981 Schrott .............. A47L 15/4229
134/115 R

FOREIGN PATENT DOCUMENTS

CN 103082974 A 5/2013
DE 38 02 447 A1 3/1989
(Continued)

OTHER PUBLICATIONS

Brignone, Translation of German Patent DE3802447A1, Mar. 1989 [Retrieved on Sep. 26, 2019]. Retrieved from the internet <https://worldwide.espacenet.com/pub>. (Year: 1989).*
(Continued)

Primary Examiner — Matthew O Savage
(74) Attorney, Agent, or Firm — Sughrue Mion, PLLC

(57) ABSTRACT

An integrated component for supplying and treating water for a dishwashing machine having a washing tank includes a monolithic body of plastics material, within which an inlet conduit for water, a chamber containing substances with water-softening properties, into which the inlet conduit leads, a salt-containing reservoir arranged in the lowermost portion of the body and having a filler tube for loading the salt and to be connected to the washing tank, a compartment for blowing out vapours having an inlet opening to be connected to the washing tank and an outlet opening, an
(Continued)

outlet conduit of water, a conduit for supplying water to the reservoir to produce the brine, and a conduit connecting the reservoir to the chamber are defined. The monolithic body has at least one protrusion, to which a sealing gasket is associated, for the direct connection within an opening of corresponding shape of the washing tank.

12 Claims, 8 Drawing Sheets

(52) U.S. Cl.
CPC .... *C02F 2103/002* (2013.01); *C02F 2303/16* (2013.01); *C02F 2307/12* (2013.01)

(58) Field of Classification Search
USPC ........................................................ 210/281
See application file for complete search history.

(56) References Cited

FOREIGN PATENT DOCUMENTS

| EP | 0 205 788 B1 | 10/1989 |
|----|--------------|---------|
| EP | 0 205 787 B1 | 1/1990 |
| EP | 0 367 062 A1 | 5/1990 |
| EP | 0 367 062 B1 | 5/1990 |
| EP | 0 571 806 B1 | 6/1996 |
| EP | 0 753 282 A1 | 1/1997 |
| EP | 0 565 876 B1 | 5/1997 |
| EP | 1 844 694 A | 10/2007 |
| EP | 2 033 566 A1 | 3/2009 |
| EP | 1 844 693 B1 | 3/2010 |
| EP | 1 497 491 B1 | 12/2012 |
| EP | 2 561 790 B1 | 12/2014 |
| EP | 2 564 752 B1 | 2/2016 |
| FR | 2.104.043 A5 | 4/1972 |
| FR | 2.158.586 A5 | 6/1973 |

OTHER PUBLICATIONS

Written Opinion for PCT/IB2016/053611, dated Sep. 22, 2016.
International Search Report for PCT/IB2016/053611, dated Sep. 22, 2016.
Communication dated Oct. 8, 2019, from the China National Intellectual Property Administration in counterpart Application No. 201680035793.8.

* cited by examiner

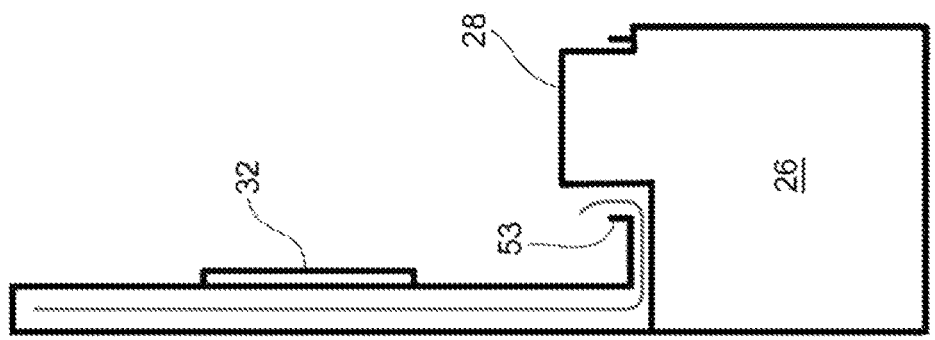
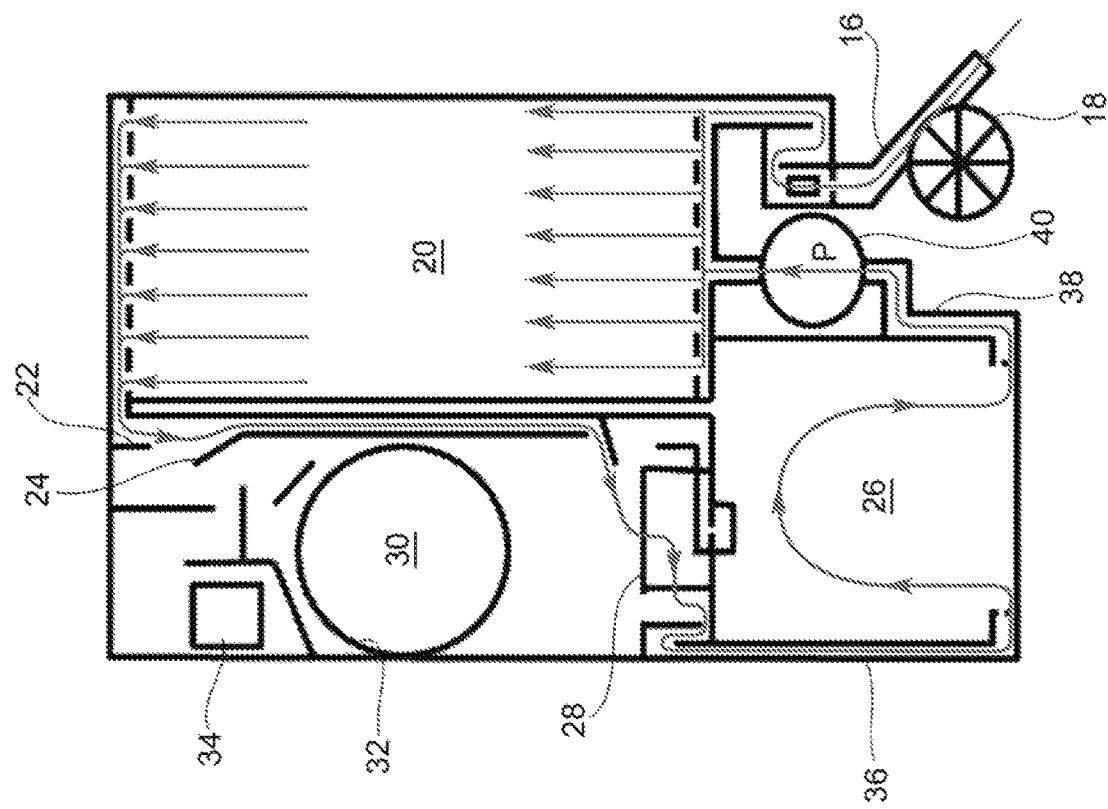

US 10,646,098 B2

INTEGRATED COMPONENT FOR A DISHWASHING MACHINE

CROSS REFERENCE TO RELATED APPLICATIONS

This application is a National Stage of International Application No. PCT/I132016/053611 filed Jun. 17, 2016, claiming priority based on Italian Patent Application No. 102015000025456 filed Jun. 19, 2015, the contents of all of which are incorporated herein by reference in their entirety.

BACKGROUND OF THE INVENTION

Field of the Invention

The present invention relates to the field of dishwashing machines and in particular to the accessories for softening the mains water supplied to it.

Background

Various water-softening devices form part of the prior art, some of which are described in the prior art documents cited hereinbelow.

EP 0 205 787 and EP 0 205 788 describe dishwashing machines provided with a bulky decalcifying device, which has a vessel intended specifically to contain the water to be supplied to the salt reservoir so as to produce a brine for regenerating ion exchange resins, and in which the salt reservoir is above the chamber which contains said resins.

EP 0 367 062 describes a decalcifying device which has a single body formed at least by three parts welded together and is provided with a vessel intended specifically to contain the water to be supplied to the salt reservoir so as to produce a brine for regenerating ion exchange resins.

EP 0 565 876 and EP 0 571 806 describe bulky decalcifying devices each provided with a vessel intended specifically to contain the water to be supplied to the salt reservoir, wherein the regeneration process is controlled by means of two separate electric control devices.

EP 2 564 752 describes a decalcifying device formed by a number of separate parts assembled together.

EP 1 497 491 describes a decalcifying device, wherein the resin regeneration takes place in an open circuit and which lacks a device for blowing out the vapours which form inside the washing tank of the respective dishwasher.

IT 1 360 369 describes a decalcifying device formed by a number of parts welded together, wherein provision is made of a vessel intended specifically to contain the water to be supplied to the salt reservoir, and wherein the conduit for blowing out vapours from the washing tank is formed at the filler tube for loading the salt, thus compromising the drying efficiency.

SUMMARY OF THE INVENTION

It is an object of the present invention to provide a decalcifying device and a dishwashing machine in which it is installed which have a structure and production method which are simplified with respect to those described in the prior art.

According to the invention, this object is achieved by an integrated component having the features mentioned specifically in the accompanying claim 1. Preferred features of the invention are specified in the dependent claims.

The present invention also relates to a dishwashing machine comprising an integrated component of the type mentioned above.

BRIEF DESCRIPTION OF THE DRAWINGS

Further advantages and features of the present invention will become evident from the detailed description hereinbelow, which is provided purely by way of non-limiting example and with reference to the accompanying drawings, in which:

FIGS. 8 and 9 are schematic views in frontal and lateral elevation, respectively, of the hydraulic circuit of the component of the invention during the regeneration step.

DETAILED DESCRIPTION OF THE INVENTION

Figure 1:
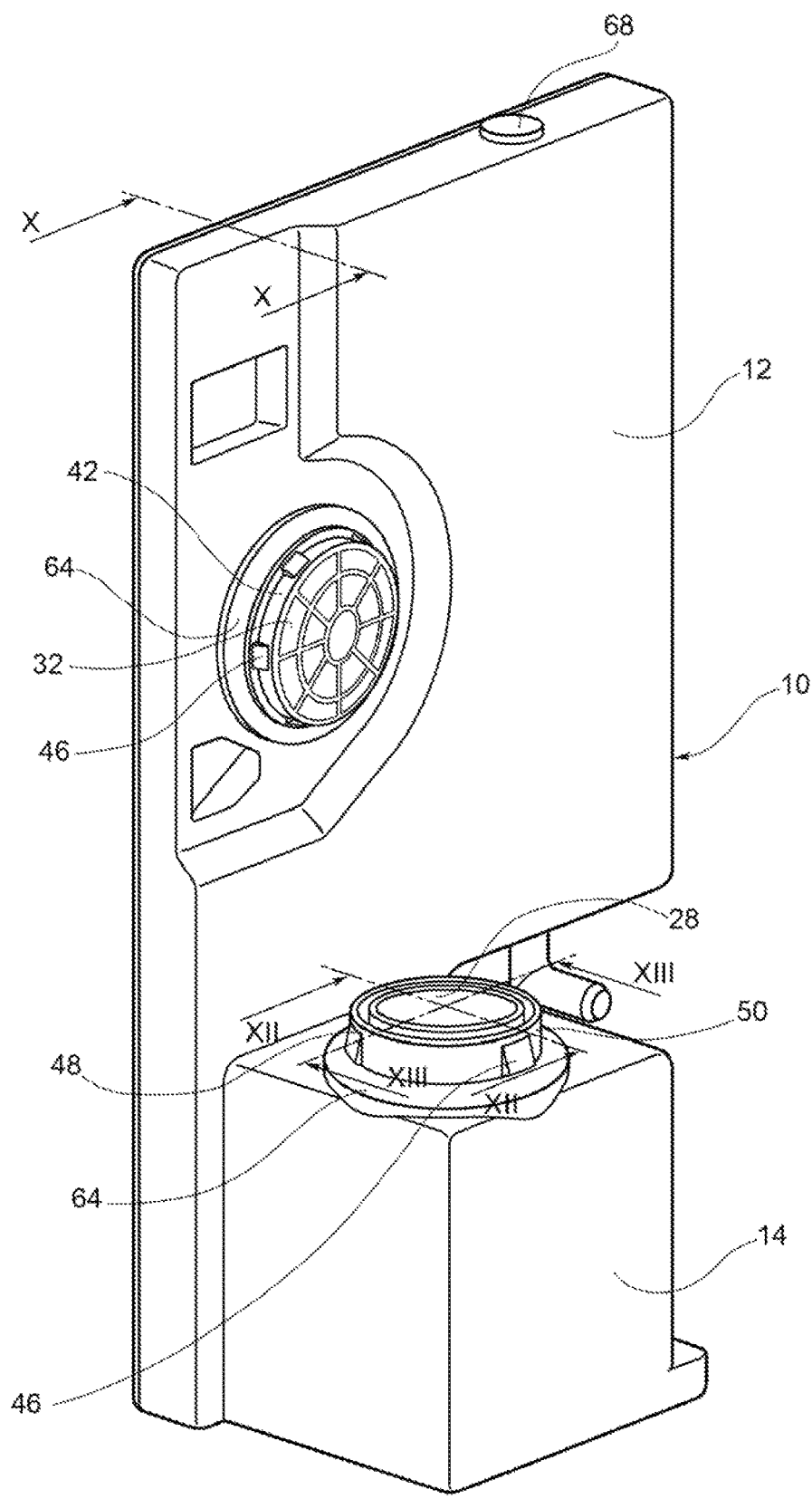
FIG. 1 is a perspective view of an integrated component of the invention.

FIG. 1 shows an integrated component for supplying and treating water for a dishwashing machine, said component comprising a monolithic body 10 of plastics material. The latter comprises an approximately flat part 12 arranged in a substantially vertical manner, from a lower portion of which there protrudes an attachment 14 having a substantially parallelepiped shape. The term "monolithic" in the present description is intended to mean an assembly formed by two or more parts which are joined permanently to one another and are no longer separable, apart from possibly as a result of irreversible breakage.

Figure 2:
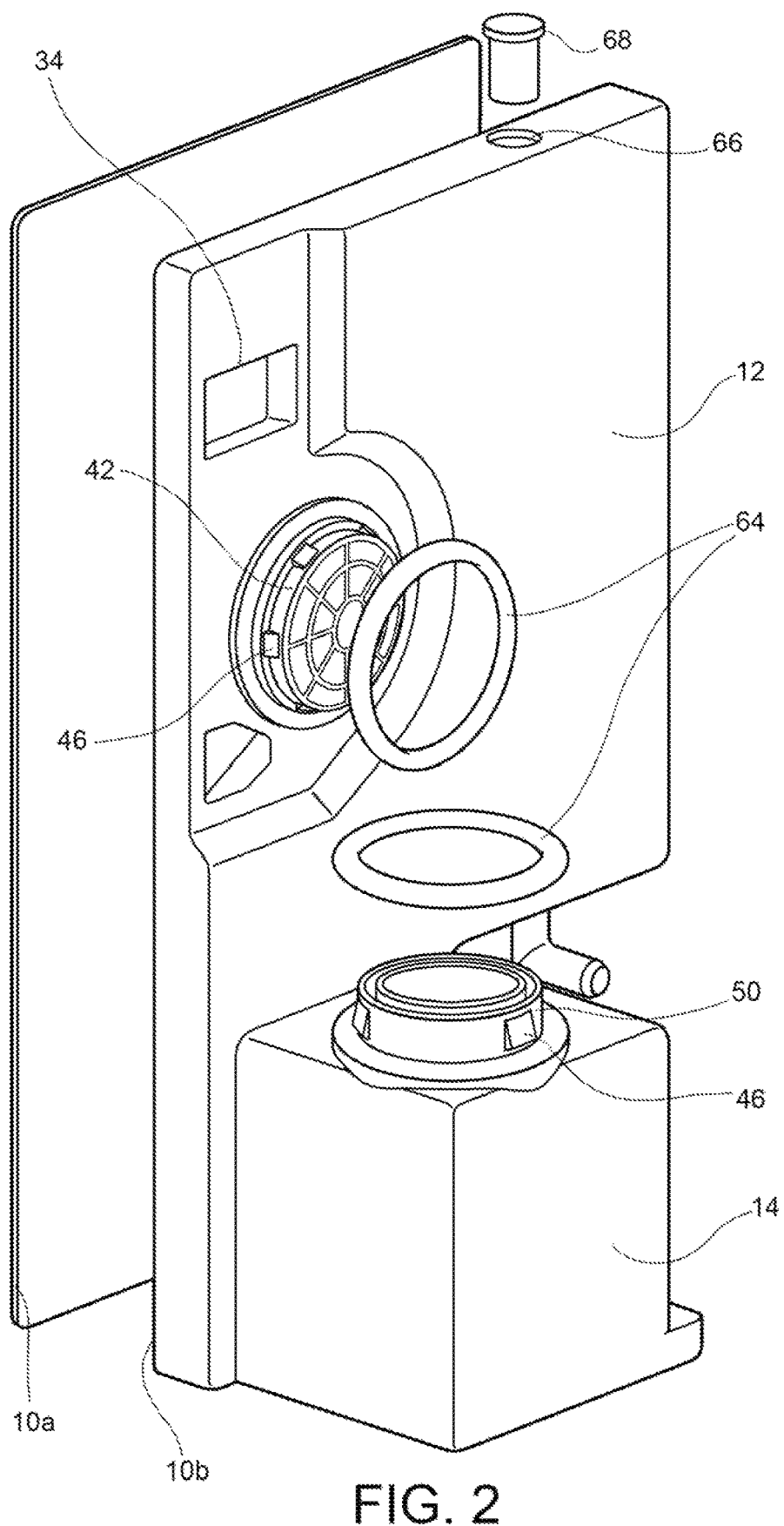
FIG. 2 is a view of the component shown in FIG. 1, with a number of parts in exploded form.
Figure 12:
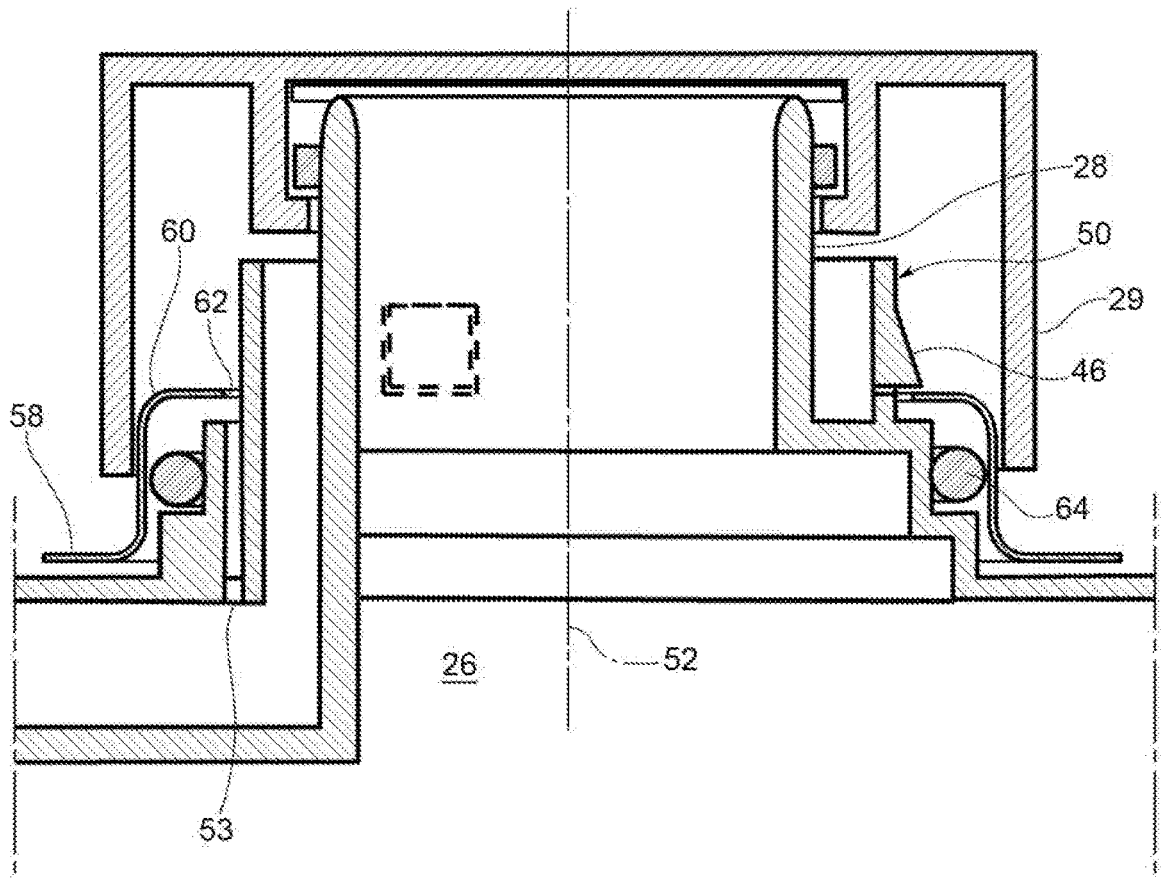
FIG. 12 is a view in vertical section of the detail shown in the preceding figure along the line XII-XII shown in FIG. 1.
Figure 13:
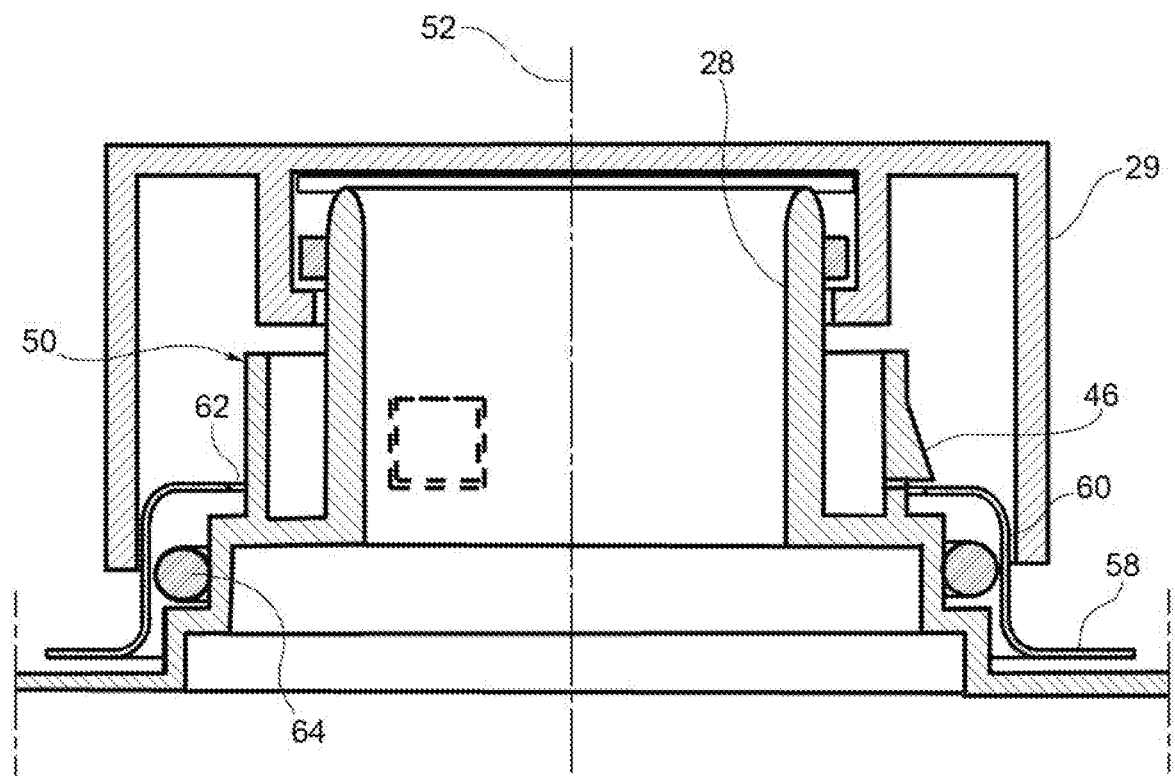
FIG. 13 is a view in vertical section of the detail shown in FIG. 11 along the line XIII-XIII.

Advantageously, the monolithic body 10 is produced by welding together (FIG. 2) two half-parts 10a, 10b along a line which lies in a vertical plane. The half-part 10a, arranged at the rear with reference to FIG. 2, may be a simple planar sheet, or may include elevations which, in combination with those of the half-part 10b, form the internal circuits of the component, which includes (FIGS. 6-9):

- an inlet conduit 16 for water, on which a flowmeter 18 is optionally positioned;
- a chamber 20 containing substances with water-softening properties, in particular ion exchange resins, into which the inlet conduit 16 opens out and out of which there leads an outlet conduit 22 having an air break 24 in its initial section;
- a salt-containing reservoir 26, positioned in the attachment 14, that is in the lowest portion of the body 10, and having a filler tube 28 for loading the salt, which is provided with a plug 29 (shown for greater clarity only in FIGS. 12 and 13);

a compartment 30 for blowing out vapours, having an inlet opening 32 and an outlet opening 34;

a conduit 36 for supplying water to the reservoir 26 so as to produce a brine for regenerating substances with water-softening properties; and a conduit 38 for connecting the reservoir 26 to the chamber 20, on which there are positioned means for controlling the flow of the brine, such as a pump 40.

Figure 10:
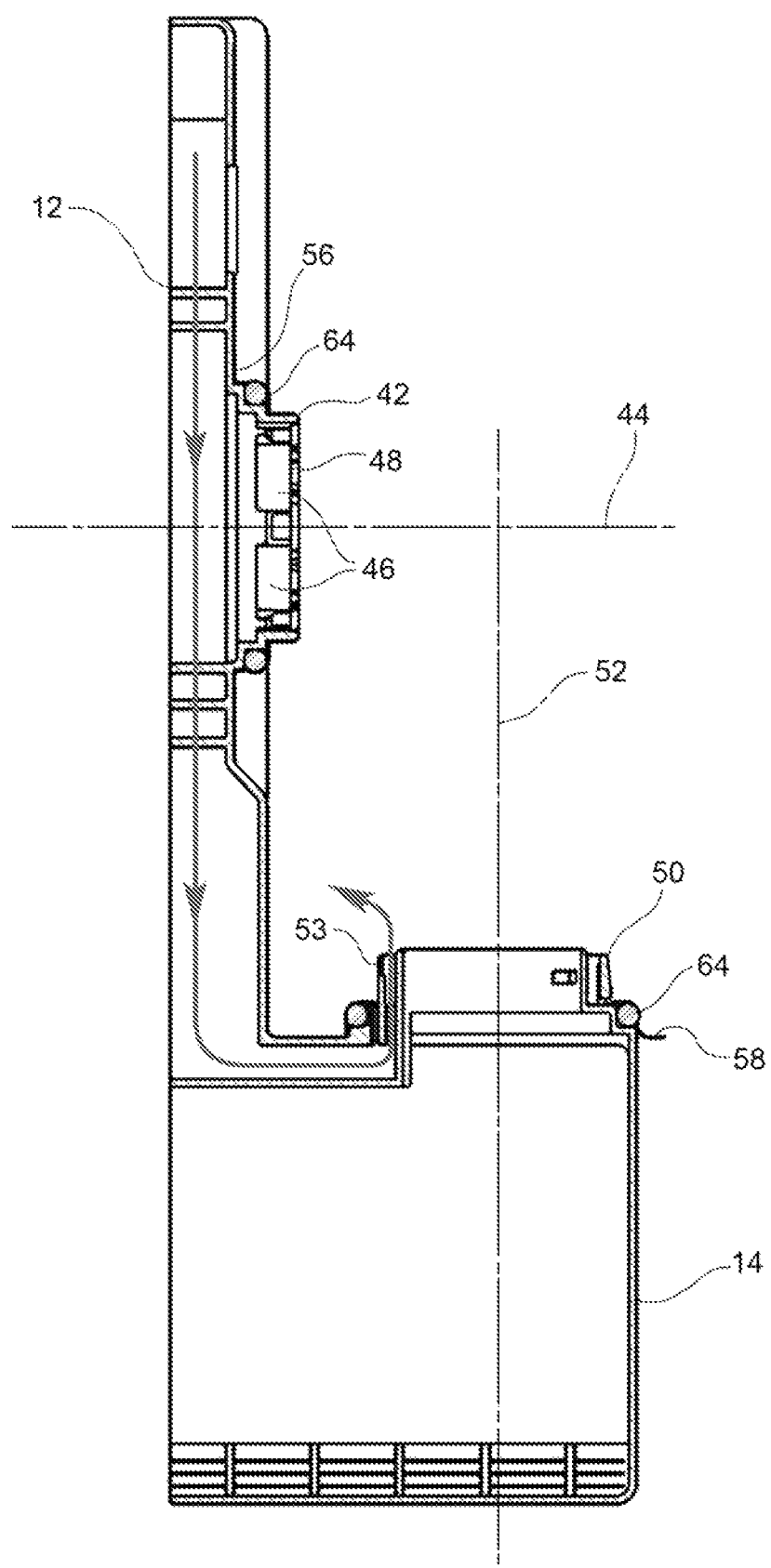
FIG. 10 is a view in vertical section of the integrated component of the invention along the line X-X shown in FIG. 1.
Figure 11:
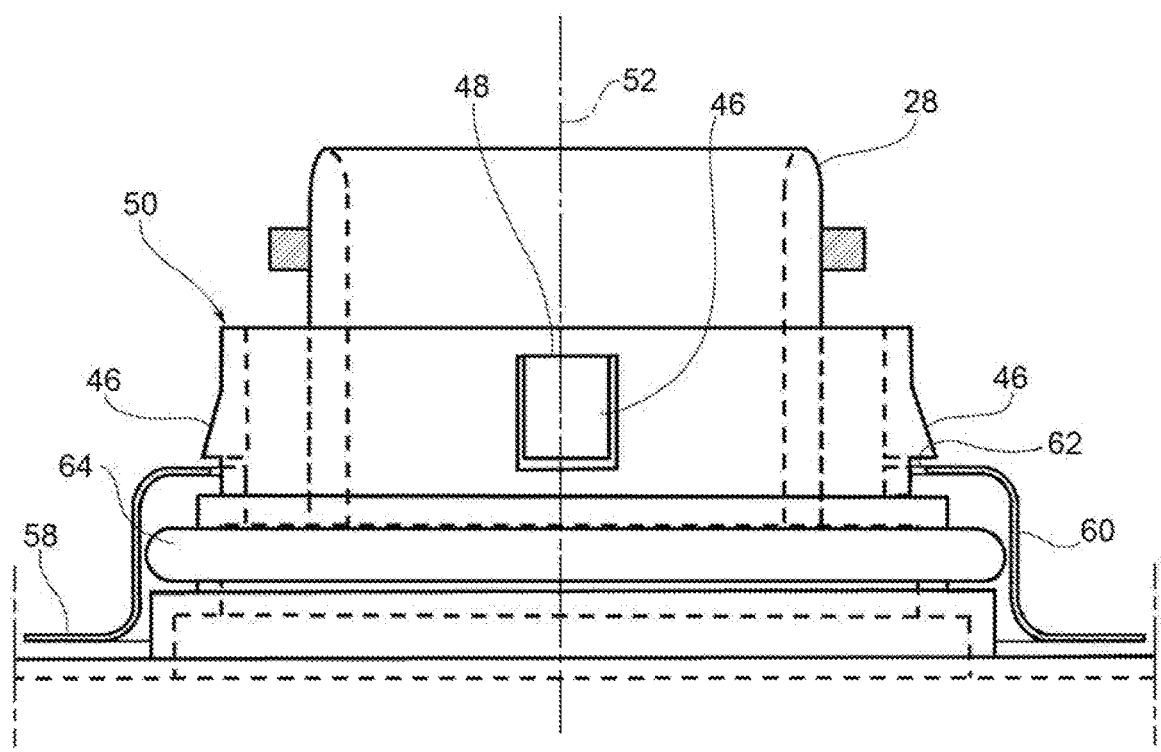
FIG. 11 is an elevated view, on an enlarged scale, of a detail (salt loading zone) of the integrated component of the invention.

The inlet opening 32 of the compartment 30 for blowing out vapours is formed (FIGS. 1 and 10) in a protrusion 42 of the central portion of the substantially flat part 12, which has a substantially circular cross section and a substantially horizontal axis 44 and has a plurality of elastic tabs 46 on its lateral external surface. Each tab 46 has, in plan view, a substantially rectangular shape, is connected to the protrusion 42 only on one side 48, and has a thickness which increases gradually proceeding towards the opposite side which constitutes a free edge. On the other hand, the filler tube 28 for loading the salt is part of a protrusion 50 of the attachment 14 of the monolithic body 10, said filler tube having a substantially circular cross section and a substantially vertical axis 52 and having a plurality of elastic tabs 46 on its lateral external surface. The structure of these tabs 46 is substantially analogous to that of the tabs described previously in relation to the protrusion 42.

Figure 3:
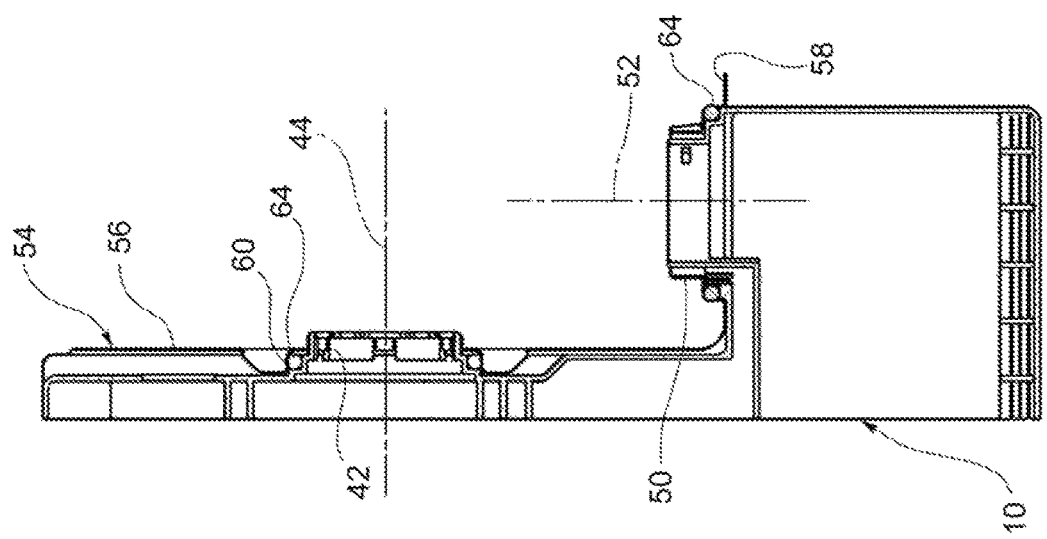
FIGS. 3 to 5 are schematic elevated views illustrating successive steps for mounting the component of the preceding figures on a washing tank.
Figure 4:
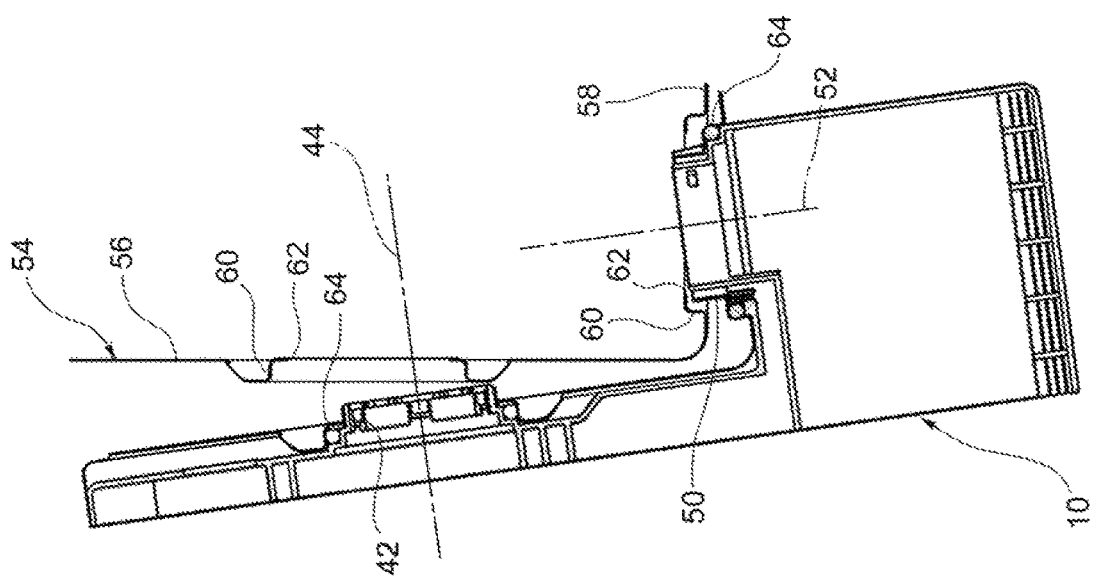
Figure 5:
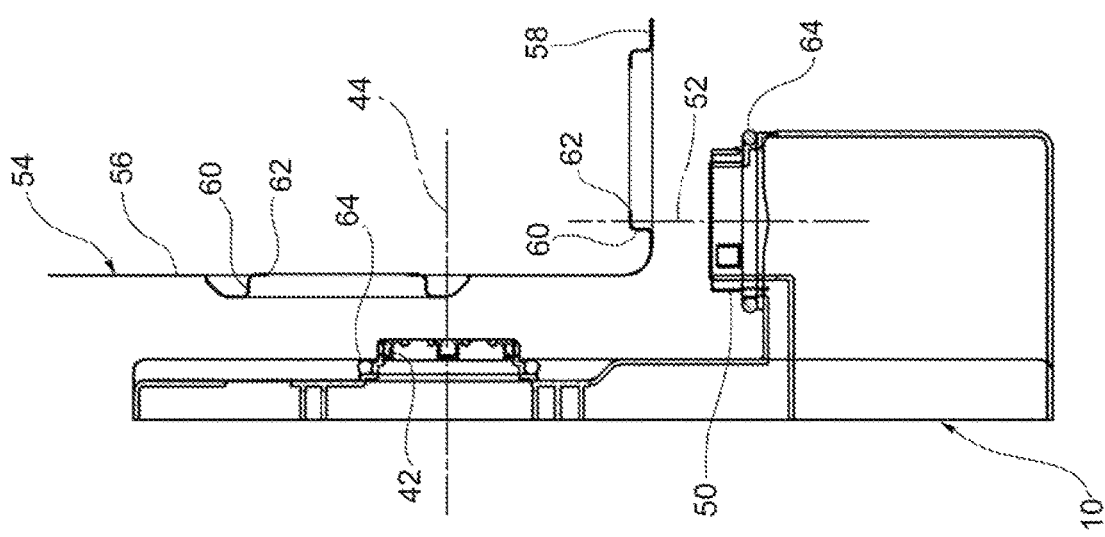

As is shown in FIGS. 3-5, the protrusions 42, 50 make it possible for the component to be connected directly to a washing tank 54 of the dishwashing machine, without it being necessary to use additional fixing elements, such as nuts and the like, and/or tubes, thereby facilitating the adoption of automated assembly processes. In particular, first the protrusion 50 (FIG. 4) and then the protrusion 42 (FIG. 5) are connected. The possibility to conventionally use known fixing elements, such as tightening nuts and the like, for at least one of the two connections is not excluded, however.

The tank 54 is made from metal sheet and has, in a substantially vertical side wall 56 and in a substantially horizontal bottom wall 58, a respective projection 60, within each of which provision is made of an opening 62 having a shape corresponding to that of the protrusion 42, 50 of the integrated component inserted therein. This insertion is made possible by the curvature of the respective elastic tabs 46, which firstly curve inwards radially and then expand radially outwards, acting as elastic holding means which prevent subsequent inadvertent removal of the component. A water-tight seal at the openings 62 of the tank 54 is ensured by respective O-rings 64 arranged between the internal wall of each projection 60 and a facing section of the external wall of the protrusion 42, 50. In particular, the gaskets 64 form a radial seal, that is in the transverse direction with respect to the mouth of the respective opening 62, between the protrusion 42, 50 and the walls 56, 58 of the washing tank 54.

Once the component has been connected to the washing tank 54 at the vertical wall 56 and at the horizontal wall 58, the weight of said component is supported essentially by the protrusion 42 of the central portion of the substantially flat part 12.

Both of the connections between the openings 62 of the tank 54 and the protrusions 42, 50 of the monolithic body 10 are formed with a certain degree of play, corresponding to the machining tolerances with which the openings 62 can be formed. In particular, the connection which involves the protrusion 42 has to allow a movement along the horizontal axis 44, whereas the connection which involves the protrusion 50 has to allow a movement along the vertical axis 52.

The presence of a respective connection on each of the two orthogonal walls 56, 58 in any case makes the assembly of the component on the tank 54 intrinsically stable, and therefore the presence of elastic holding means, such as the tabs 46, on the protrusions 42, 50 is not essential. Indeed, embodiments of the present invention (not shown in the figures) are possible in which the protrusions 42, 50 do not have tabs 46 and the component is kept assembled on the tank 54 owing to the interference which exists between the respectively facing parts and the interposed O-rings 64.

At the end of the assembly process, the opening 32 is in communication with the tank 54 and can thus act as an inlet into the compartment 30 for the vapours which are generated in the tank 54 during the washing operations and should be removed. In a manner known per se, these vapours can be discharged later passing through the outlet opening 34 of the compartment 30. This discharge also makes it possible to dampen any pressure variations which form in the washing tank 54 due to variations in temperature.

At the top (FIG. 1), the chamber 20 containing ion exchange resins has an outwards opening 66 provided with a removable plug 68, also typically made of plastics material, such as to allow for the introduction or removal of said resins, as desired. The plug 68 has a plastic coupling advantageously with a degree of play of less than 0.2 mm in the part in contact with the resins and a coupling on the wall of the opening 66 which prevents water escaping owing to a plastic-on-plastic contact. If appropriate, provision may be made for a sealing gasket to be present between the wall of the opening 66 and the plug 68. In embodiments of the invention which are not shown, the plug 68 may be formed in one piece with one of the two half-parts 10*a*, 10*b*, to which it is connected by a flap or similar holding means which allow for the opening/closing movement with respect to the opening 66, in any case holding the plug on the body 10.

This arrangement is extremely advantageous because it makes it possible to hydraulically test the component before the resins are introduced into the chamber 20. As a result, only the parts which have passed the test are loaded with the resins, whereas those which are rejected can be passed on directly for the recycling operations. Analogously, at the end of the service life of the component, it is possible to remove the plug 68 and empty the chamber 20 of the resins, such that in this case, too, the component from which the latter have been removed can easily be recycled.

Figure 7:
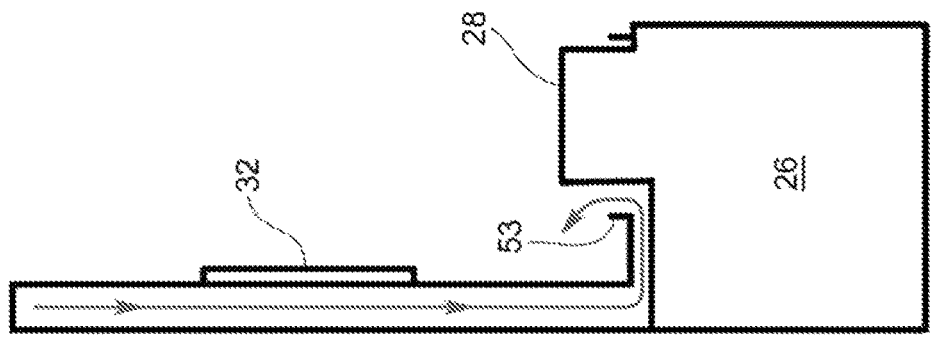
FIGS. 6 and 7 are schematic views in frontal and lateral elevation, respectively, of the hydraulic circuit of the component of the invention during the water-softening step.
Figure 6:
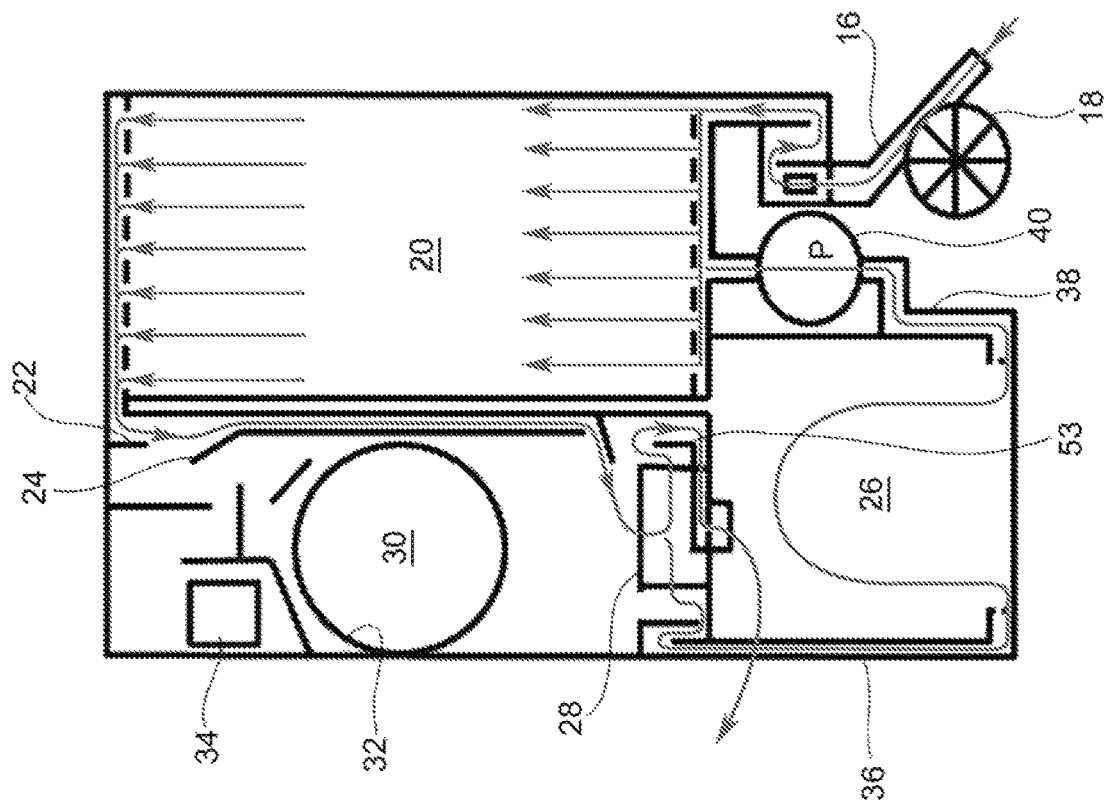

During normal operation of the component, the mains water is supplied from the inlet conduit 16 into the chamber 20, where it is decalcified by the ion exchange resins (cf. FIGS. 6 and 7). The decalcified water exits from the top of the chamber 20 through the conduit 22, and firstly passes through the air break section 24, which does not cause a loss of pressure owing to its position downstream of the chamber 20. Then, the decalcified water enters (FIGS. 10 and 12) into a conduit 53, which issues, in a manner known per se, into the washing tank 54 through a passage formed between an arch of the circumferential wall of the filler tube 28 and the wall of the protrusion 50 arranged coaxially outside it.

When the ion exchange resins are exhausted, it is necessary to regenerate them. For this purpose (cf. FIGS. 8 and 9), it is sufficient to activate a single control device, that is the pump 40 positioned on the conduit 38, which forces the water remaining in the chamber 20 to enter into the supply conduit 36 of the salt reservoir 26, in which it produces a brine. The latter enters into the connecting conduit 38 and is sucked up by the pump 40 into the chamber 20, where it regenerates the ion exchange resins.

The closed-circuit regeneration method described above has a number of advantages. On the one hand, it does not involve additional consumption of water, since only that which is initially present in the chamber 20 is used, nor does it require devices for measuring and collecting the quantity of water intended to form the brine. Indeed, from that described above it results that the chamber 20 for containing ion exchange resins also acts as a container for the water intended to form the brine, thereby making it possible to do without a vessel intended specifically for that function, with a resultant simplification of the structure of the integrated component. In addition, the salt reservoir 26 is not placed under pressure, and therefore the brine cannot penetrate into the washing tank 54, even if the plug 29 of the filler tube 28 is not sealed. On account of this, the regeneration can also be carried out during any desired operating stage of the dishwashing machine, with a reduction in the overall time required by the respective washing cycle.

Clearly, without departing from the principle of the invention, the constructional details and the embodiments may be greatly varied with respect to that described purely by way of example, without thereby departing from the scope of the invention as defined in the accompanying claims. By way of example, the hydraulic circuit inside the component, which can allow for the formation of the brine and the use thereof for regenerating the resins, may be formed in any other known manner, such as that described in EP 1 844 693 A1/EP 2 561 790 A1, the contents of which are hereby incorporated by reference in the present description. In this case, instead of providing for a pump to be present on the conduit for connecting the salt reservoir to the resin chamber, the component comprises a valve located at a point at which the conduit for supplying water to the salt reservoir branches off from the inlet conduit. This valve can thus adopt a first operating configuration, in which it blocks the flow in the conduit for supplying water towards the reservoir while it allows for the flow in the inlet conduit towards the chamber, into which all of the water is thereby directed, and a second operating configuration, in which it allows for both the flow in the conduit for supplying water towards the reservoir and the flow in the inlet conduit directed towards the chamber.

The invention claimed is:

1. An integrated component for supplying and treating water for a dishwashing machine having a washing tank (54), comprising:
a monolithic body (10) of plastics material, within which an inlet conduit (16) for water, a chamber (20) containing substances with water-softening properties, into which said inlet conduit (16) leads, a salt-containing reservoir (26) arranged in the lowermost portion of the body (10) and having a filler tube (28) for loading the salt and to be connected to the washing tank (54), a compartment (30) for blowing out vapours having an inlet opening (32) to be connected to the washing tank (54) and an outlet opening (34), an outlet conduit (22) of water from said chamber (20), a conduit (36) for supplying water contained in the chamber (20) containing substances with water-softening properties to said reservoir (26) in order to produce therein a brine for regenerating the substances with water-softening properties, and a conduit (38) connecting said reservoir (26) to said chamber (20) are defined,
wherein said monolithic body (10) has at least one protrusion (42, 50), to which a sealing gasket (64) is associated, for the direct connection within an opening (62) of corresponding shape of said washing tank (54), and which is provided with elastic holding means in respect of said washing tank (54), and
wherein said gasket (64) forms a radial seal, that is in the transverse direction with respect to the mouth of the opening (62), between said protrusion (42, 50) and the washing tank (54).

2. The component according to claim 1, wherein said elastic holding means are shaped as tabs (46) arranged on the external side wall of said protrusion (42, 50).

3. The component according to claim 1, wherein said body (10) comprises a substantially flat part (12) which is substantially vertically arranged, from whose lower portion an attachment (14), within which said reservoir (26) is arranged, protrudes, a middle portion of the substantially flat part (12) having a protrusion (42) with a substantially horizontal axis (44), in which the inlet opening (32) of the compartment (30) for blowing out vapours is done, and the reservoir (26) having a protrusion (50) with a substantially vertical axis (52), of which protrusion (50) said filler tube (28) is part.

4. The component according to claim 3, wherein said protrusion (42) with a substantially horizontal axis (44) supports the weight of the component when it is connected to said washing tank (54).

5. The component according to claim 3, wherein said chamber (20) is in said substantially flat part (12) of the body (10).

6. The component according to claim 1, wherein said monolithic body (10) is formed by welding together two half-parts (10a, 10b).

7. The component according to claim 6, wherein said monolithic body (10) is formed by welding together two half-parts (10a, 10b) along a line which substantially lies in a vertical plane.

8. The component according to claim 1, wherein said chamber (20) has an outwards opening (66) provided with a removable plug (68).

9. An integrated component for supplying and treating water for a dishwashing machine having a washing tank (54), comprising:
a monolithic body (10) of plastics material, within which an inlet conduit (16) for water, a chamber (20) containing substances with water-softening properties, into which said inlet conduit (16) leads, a salt-containing reservoir (26) arranged in the lowermost portion of the body (10) and having a filler tube (28) for loading the salt and to be connected to the washing tank (54), a compartment (30) for blowing out vapours having an inlet opening (32) to be connected to the washing tank (54) and an outlet opening (34), an outlet conduit (22) of water from said chamber (20), a conduit (36) for supplying water contained in the chamber (20) containing substances with water-softening properties to said reservoir (26) in order to produce therein a brine for regenerating the substances with water-softening properties, and a conduit (38) connecting said reservoir (26) to said chamber (20) are defined,
wherein said monolithic body (10) has at least one protrusion (42, 50), to which a sealing gasket (64) is associated, for the direct connection within an opening (62) of corresponding shape of said washing tank (54), and which is provided with elastic holding means in respect of said washing tank (54), without a vessel intended exclusively to contain the water to be supplied to the reservoir (26) so as to produce therein a brine for regenerating ion exchange resins.

10. An integrated component for supplying and treating water for a dishwashing machine having a washing tank (54), comprising:

a monolithic body (10) of plastics material, within which an inlet conduit (16) for water, a chamber (20) containing substances with water-softening properties, into which said inlet conduit (16) leads, a salt-containing reservoir (26) arranged in the lowermost portion of the body (10) and having a filler tube (28) for loading the salt and to be connected to the washing tank (54), a compartment (30) for blowing out vapours having an inlet opening (32) to be connected to the washing tank (54) and an outlet opening (34), an outlet conduit (22) of water from said chamber (20), a conduit (36) for supplying water contained in the chamber (20) containing substances with water-softening properties to said reservoir (26) in order to produce therein a brine for regenerating the substances with water-softening properties, and a conduit (38) connecting said reservoir (26) to said chamber (20) are defined, wherein said monolithic body (10) has at least one protrusion (42, 50), to which a sealing gasket (64) is associated, for the direct connection within an opening (62) of corresponding shape of said washing tank (54), and which is provided with elastic holding means in respect of said washing tank (54), wherein a pump (40) is positioned on the conduit (38) connecting said reservoir (26) to said chamber (20).

11. A dishwashing machine comprising an integrated component according to claim 1.

12. A dishwashing machine according to claim 11, in which said integrated component has been assembled by an automated process.

* * * * *